United States Patent
Matz et al.

(10) Patent No.: US 7,401,112 B1
(45) Date of Patent: Jul. 15, 2008

(54) METHODS AND APPARATUS FOR EXECUTING A TRANSACTION TASK WITHIN A TRANSACTION PROCESSING SYSTEM EMPLOYING SYMMETRIC MULTIPROCESSORS

(75) Inventors: Paul E. Matz, San Francisco, CA (US); Glen K. Okita, San Jose, CA (US); Gebran Chahrouri, Menlo Park, CA (US); Michael Butensky, Los Altos, CA (US)

(73) Assignee: Aspect Communication Corporation, San Jose, CA (US)

( * ) Notice: Subject to any disclaimer, the term of this patent is extended or adjusted under 35 U.S.C. 154(b) by 0 days.

(21) Appl. No.: 09/320,252

(22) Filed: May 26, 1999

(51) Int. Cl.
*G06F 15/16* (2006.01)
*G06F 9/46* (2006.01)
*H04M 3/00* (2006.01)
*H04M 5/00* (2006.01)

(52) U.S. Cl. .................. 709/202; 718/103; 379/265.02; 379/265.05

(58) Field of Classification Search ................ 709/200, 709/100, 101–108, 223–226; 718/100–108; 379/265.01–309; 719/313–318
See application file for complete search history.

(56) References Cited

U.S. PATENT DOCUMENTS

| | | | |
|---|---|---|---|
| 5,185,861 A * | 2/1993 | Valencia ..................... 711/120 |
| 5,214,756 A | 5/1993 | Franklin et al. |
| 5,323,452 A | 6/1994 | Dickman et al. |
| 5,327,557 A * | 7/1994 | Emmond ....................... 707/3 |
| 5,367,624 A | 11/1994 | Cooper |
| 5,404,523 A | 4/1995 | DellaFera et al. |
| 5,455,854 A | 10/1995 | Dilts et al. |
| 5,455,903 A | 10/1995 | Jolissaint et al. |
| 5,535,322 A | 7/1996 | Hecht |
| 5,555,179 A | 9/1996 | Koyama et al. |
| 5,560,029 A * | 9/1996 | Papadopoulos et al. ....... 712/25 |
| 5,586,312 A | 12/1996 | Johnson et al. |
| 5,649,131 A | 7/1997 | Ackerman et al. |
| 5,734,837 A | 3/1998 | Flores |
| 5,745,763 A * | 4/1998 | Mealey et al. ................ 719/321 |
| 5,745,778 A * | 4/1998 | Alfieri ........................... 712/1 |
| 5,765,033 A | 6/1998 | Miloslavsky |
| 5,799,297 A | 8/1998 | Goodridge et al. |
| 5,812,989 A | 9/1998 | Witt et al. |
| 5,818,469 A * | 10/1998 | Lawless et al. .............. 345/522 |
| 5,832,611 A | 11/1998 | Schmitz et al. |
| 5,842,226 A * | 11/1998 | Barton et al. ................ 711/203 |
| 5,848,393 A | 12/1998 | Goodridge et al. |
| 5,903,730 A | 5/1999 | Asai et al. |

(Continued)

OTHER PUBLICATIONS

"Processes and Threads" *Inside Windows NT*, Microsoft Press, Chapter Four, pp. 141-215.

(Continued)

*Primary Examiner*—Nathan J. Flynn
*Assistant Examiner*—David England
(74) *Attorney, Agent, or Firm*—Welsh & Katz, Ltd.

(57) ABSTRACT

A method of executing a transaction task within a transaction processing system includes, responsive to an event, the steps of identifying a workflow associated with the event. A transaction task, that at least partially executes the workflow, is distributed to an available thread within a pool threads operating within a multiprocessor system, that may be a Symmetrical Multiprocessor (SMP) system.

21 Claims, 10 Drawing Sheets

U.S. PATENT DOCUMENTS

| | | | |
|---|---|---|---|
| 5,918,226 | A | 6/1999 | Tarumi et al. |
| 5,926,539 | A | 7/1999 | Shtivelman |
| 5,940,804 | A | 8/1999 | Turley et al. |
| 5,946,387 | A | 8/1999 | Miloslavsky |
| 5,953,332 | A | 9/1999 | Miloslavsky |
| 5,953,405 | A | 9/1999 | Miloslavsky |
| 5,999,911 | A | 12/1999 | Berg et al. |
| 5,999,965 | A * | 12/1999 | Kelly ............... 709/202 |
| 6,002,760 | A | 12/1999 | Gisby |
| 6,021,428 | A | 2/2000 | Miloslavsky |
| 6,044,145 | A | 3/2000 | Kelly et al. |
| 6,044,368 | A | 3/2000 | Powers |
| 6,052,684 | A | 4/2000 | Du |
| 6,067,357 | A | 5/2000 | Kishinsky et al. |
| 6,105,053 | A * | 8/2000 | Kimmel et al. ............ 718/105 |
| 6,108,711 | A | 8/2000 | Beck et al. |
| 6,134,318 | A * | 10/2000 | O'Neil ............... 379/266.01 |
| 6,138,139 | A | 10/2000 | Beck et al. |
| 6,151,688 | A * | 11/2000 | Wipfel et al. ............ 709/224 |
| 6,167,395 | A | 12/2000 | Beck et al. |
| 6,167,423 | A * | 12/2000 | Chopra et al. ............ 709/100 |
| 6,170,011 | B1 | 1/2001 | Beck et al. |
| 6,175,563 | B1 | 1/2001 | Miloslavsky |
| 6,175,564 | B1 | 1/2001 | Miloslavsky et al. |
| 6,185,292 | B1 | 2/2001 | Miloslavsky |
| 6,192,121 | B1 * | 2/2001 | Atkinson et al. ....... 379/265.01 |
| 6,222,530 | B1 * | 4/2001 | Sequeira ............... 707/500.1 |
| 6,223,207 | B1 * | 4/2001 | Lucovsky et al. ............ 709/102 |
| 6,226,377 | B1 * | 5/2001 | Donaghue, Jr. ........ 379/265.13 |
| 6,237,024 | B1 * | 5/2001 | Wollrath et al. ............ 709/203 |
| 6,243,092 | B1 | 6/2001 | Okita et al. |
| 6,243,105 | B1 | 6/2001 | Hoyer et al. |
| 6,263,359 | B1 * | 7/2001 | Fong et al. ............ 718/103 |
| 6,269,390 | B1 * | 7/2001 | Boland ............... 709/100 |
| 6,279,009 | B1 | 8/2001 | Smirnov et al. |
| 6,289,369 | B1 * | 9/2001 | Sundaresan ............ 709/100 |
| 6,314,089 | B1 * | 11/2001 | Szlam et al. ............ 370/270 |
| 6,314,430 | B1 * | 11/2001 | Chang ............... 707/103 R |
| 6,345,305 | B1 | 2/2002 | Beck et al. |
| 6,351,778 | B1 * | 2/2002 | Orton et al. ............ 709/310 |
| 6,373,836 | B1 | 4/2002 | Deryugin et al. |
| 6,389,007 | B1 | 5/2002 | Shenkman et al. |
| 6,393,015 | B1 | 5/2002 | Shtivelman |
| 6,411,982 | B2 * | 6/2002 | Williams ............ 718/102 |
| 6,418,458 | B1 * | 7/2002 | Maresco ............ 718/103 |
| 6,434,590 | B1 * | 8/2002 | Blelloch et al. ............ 718/102 |
| 6,650,748 | B1 * | 11/2003 | Edwards et al. ........ 379/266.04 |
| 6,658,447 | B2 * | 12/2003 | Cota-Robles ............ 718/103 |
| 6,690,788 | B1 * | 2/2004 | Bauer et al. ............ 379/242 |
| 6,721,778 | B1 * | 4/2004 | Smith et al. ............ 718/103 |
| 6,732,156 | B2 | 5/2004 | Miloslavsky |
| 2003/0115545 | A1 | 6/2003 | Hull et al. |

OTHER PUBLICATIONS

"A Mitem View Customer Reference", http://www.mitem.com/resources/caseStudies/pdfs/norwest.pdf, Norwest Mortage, Inc. ,(1996-1999),2 pgs.

Edstrom, D. , et al., "CETI Operations and Support Plan—Draft", http://www.csufresno.edu/ait/ceti/tech/ops1210.html; *paper prepared by Operations and Support Team, D. Edstrom et al co-leaders*, (Dec. 10, 1997),75 pgs.

Farhooi, F. , et al., "Competing for the Future with Intelligent Agents", http://home1.gte.net/pfingar/agents_doc_rev4.htm; *Distributed Object Computing, "DOC" Magazine, the endorsed publication of the Object Management Group, part 1*, Oct. 1997-*part 2*, Nov. 1997, (1997), 10 pgs.

Pan, Alex, "IT Architect—Enterprise Application Integration—Message Broker Style—pointers on evaluation and integration", http://sunsite.uakom.sk/sunworldonline/swol-08-itarchitect.htm; *Sunworld* Sep. 1999, (1999).

Peter, Fingar, "Intelligent Agents: The Key to Open eCommerce", http://home1.gte.net/pfingar/csAPR99.html; *Component Strategies* Apr. 1999.

Scacchi, W. , "Experience with Software Process Simulation and Modeling", http://www.usc.edu/dept/ATRIUM/Papers/JSS98/JSS98.htm; *Walter Scacchi, Atrium Laboratory, University of Southern California, Presented at ProSim 98*, Silver Falls Oregon, Jun. 22-24, 1998, (Jun. 1998).

Baresi, L , et al., "Wide Workflow Development Methodology (online)", *International Conference on Work activities Coordination and Collaboration*, (Mar. 3, 1999), 1, 27, 28, 36-54.

Microsoft Corporation, "Microsoft Project for Window", *Reference—Business Project Planning System. Version 1.0.* (1990),86-89, 137, 260, 288-89.

\* cited by examiner

METHODS AND APPARATUS FOR EXECUTING A TRANSACTION TASK WITHIN A TRANSACTION PROCESSING SYSTEM EMPLOYING SYMMETRIC MULTIPROCESSORS

FIELD OF THE INVENTION

The present invention relates generally to the field of transaction processing. More specifically, the present invention relates to the executing of a transaction task within a transaction processing system employing a multiprocessor (MP) architecture.

BACKGROUND OF THE INVENTION

Historically, transaction processing systems, such as for example Automatic Call Distributors (ACDs), have employed multiple processors and multiple operating systems for managing various tasks, including call routing, within such transaction processing systems. For example, in an exemplary ACD, a single processor and a single operating system may be dedicated to servicing non-critical tasks, such as historical and real-time reporting, database administration and system maintenance tasks. A further single processor and a single operating system within the ACD may then be dedicated to servicing real-time, critical tasks, such as ring no answer timing and other central office signaling tasks. Accordingly, the different operating systems may be utilized for servicing the respective non-critical tasks and the real-time, critical tasks. For example, the reporting, administration and maintenance tasks may be performed by a multipurpose operating system such as Unix. On the other hand, the real-time, critical tasks may be performed by a real-time operating system such as the VxWorks operating system developed by Wind River Systems, Inc. of Alameda, Calif., the PSOS operating system or the Lynx operating system. By restricting the execution of tasks to a particular processor and a particular operating system, a transaction processing system may be unable to respond to peak performance demands in certain situations.

SUMMARY OF THE INVENTION

According to the present invention, there is provided a method of executing a transaction task within a transaction processing system. Responsive to an event, a workflow associated with the event is identified. A transaction task, that at least partially executes the workflow, is distributed to an available thread within a pool threads operating within a multiprocessor system.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

Other features of the present invention will be apparent from the accompanying drawings and from the detailed description which follows.

DETAILED DESCRIPTION

A method and apparatus for executing a transaction task within a multiprocessor (MP) transaction processing system are described. In the following description, for the purposes of explanation, numerous specific details are set forth in order to provide a thorough understanding of the present invention. It will be evident, however, to one skilled in the art that the present invention may be practiced without these specific details.

For the purposes of the present specification, the term "workflow" shall be taken to mean a sequence of steps that are performed to, at least partially, process a transaction. Further, the term "task" shall be taken to mean a process, method, operation or step that implements the performance of a workflow sequence. A task may furthermore execute a series of "sub-tasks".

The term "thread" shall be taken to refer to any entity to which an operating system allocates processor time within a computer system. Optionally, a thread may execute any part of an application's code, including a part currently being executed by another thread instance. All threads of a process may share a virtual address space, global variables, and operating system resources of the process. A process may include one or more threads that run in the context of the process. A "process" may be an application that may include a private virtual address space, code, data and other operating system resources (e.g., files, pipes and synchronization objects that are visible to the process).

Exemplary Transaction Processing Systems

Figure 1:
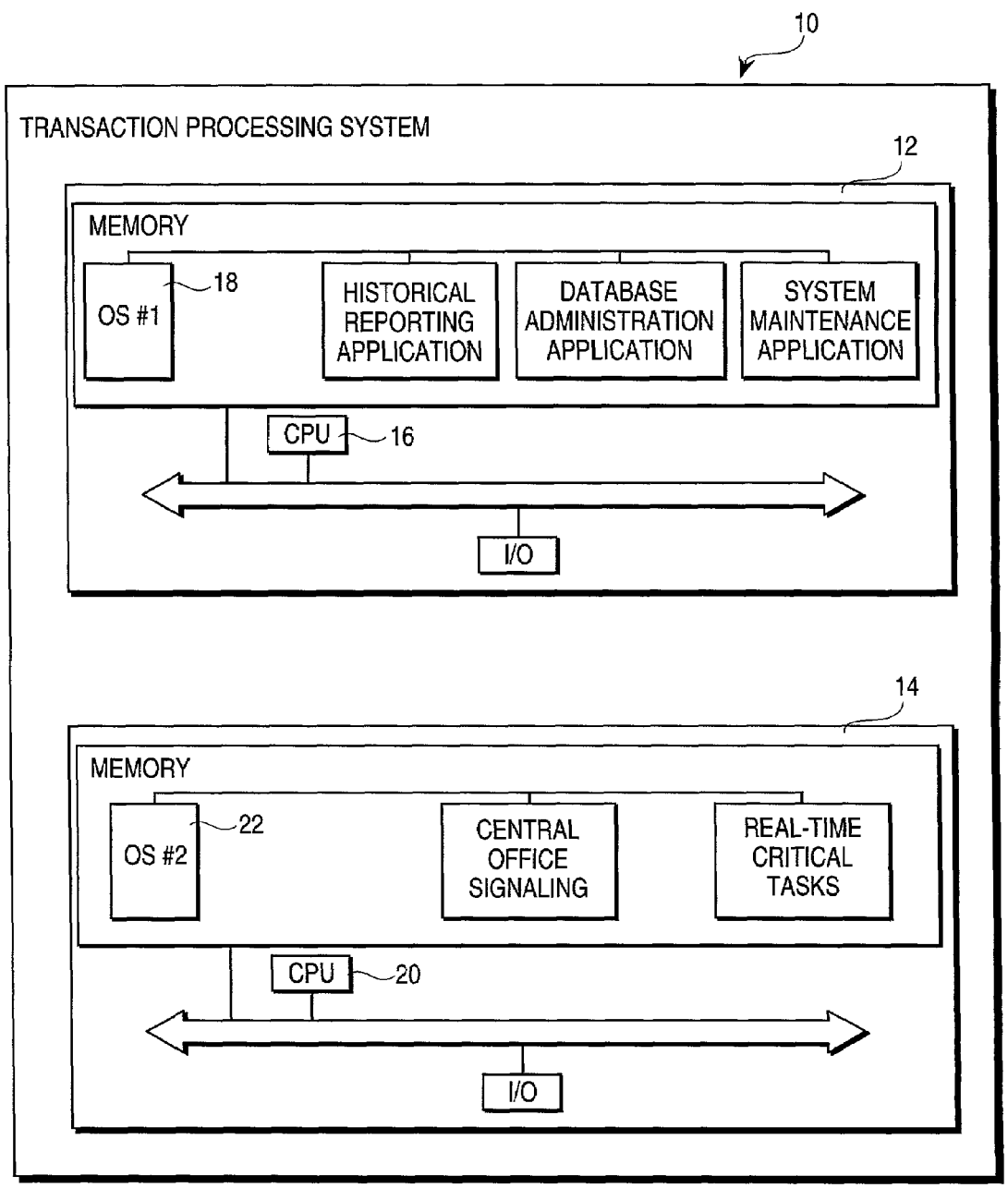
FIG. 1 is a block diagram illustrating a transaction processing system wherein separate and distinct transaction processing subsystems are dedicated to handling different types of tasks.

FIG. 1 is a block diagram illustrating a transaction processing system 10 wherein separate and distinct transaction processing subsystems 12 and 14 are dedicated to handling different types of tasks. Specifically, in the subsystem 12, a single central processing unit (CPU) 16 and a single operating system 18 service a number of non-critical applications, such as for example, a historical reporting application, a database administration application, and a system maintenance application. In the subsystem 14, a single CPU 20 and a single operating system 22 service a number of real-time, critical applications, such as a central office signaling application. A transaction processing system 10, such as that illustrated in FIG. 1, may prove to have inadequate resources to respond to peak performance demands. For example, the subsystem 14 may prove incapable of handling an unusually high level of central office signaling.

Figure 2:
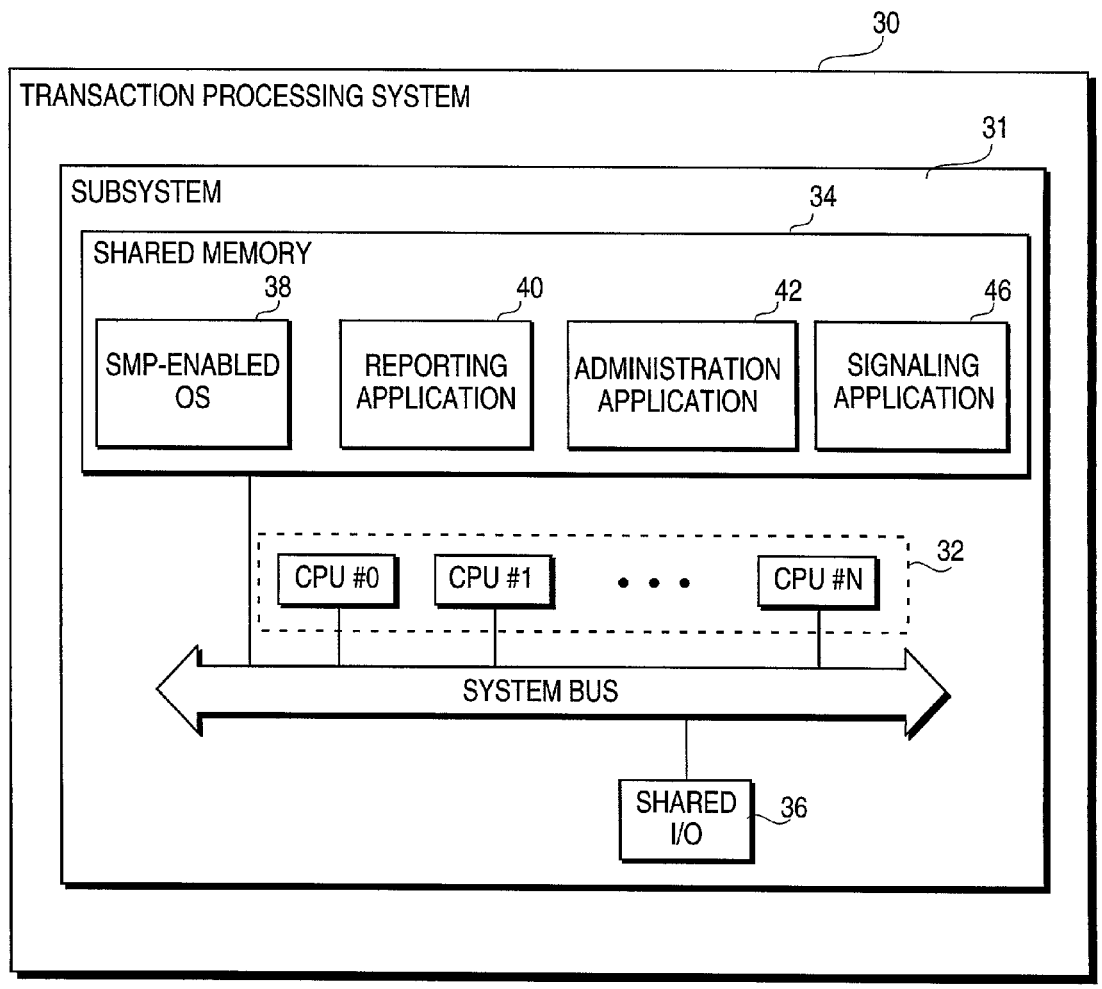
FIG. 2 is a block diagram illustrating a transaction processing system, according to an exemplary embodiment of the present invention, within which the present invention may be implemented and performed.

FIG. 2 is a block diagram illustrating a transaction processing system 30, such as for example an ACD, including a multiprocessor (MP) transaction processing subsystem 31 within which a method, according to an exemplary embodiment of the present invention, of executing a transaction task may be performed. The transaction processing subsystem 31 may be dedicated to performing a specific task within the transaction processing system 30, such as for example transaction routing. Examples of transaction routing include telephone call routing, e-mail routing, and Web request routing, as are described in further detail below, from a source to a software or human agent.

The transaction processing subsystem 31 may employ a Symmetric Multiprocessing (SMP) architecture and include a bank of processors 32 that share a memory 34 and an input/output (I/O) subsystem 36. The bank of processors 32 may include between two (2) and thirty-two (32) processors, each of which may be an Intel Pentium® Pro or Pentium II® processor manufactured by Intel Corp. of Santa Clara, Calif., or a SPARC microprocessor manufactured by Sun Microelectronics of Mountain View, Calif. The processors 32, the shared I/O subsystem 36 and the shared memory 34 are all controlled by a single executing SMP-enabled operating system 38 that resides in the shared memory 34. Examples of an SMP-enabled operating system 38 include the Windows NT® operating system developed by Microsoft Corp. of Redmond, Wash. state, the OS/2 operating system developed by IBM Corp., or a variant of the Unix operating system, such as the Solaris® operating system. The shared memory 34 is furthermore shown to host both non-critical and critical real-time applications, such as a reporting application 40, an administrative application 42 and a signaling application 44.

In a further embodiment of the present invention, the transaction processing system 30 may comprise a clustered SMP system, in which case a number of SMP systems, such as that illustrated as 31, may be included within the transaction processing system 30.

Exemplary Transaction Processing Environment

Figure 3:
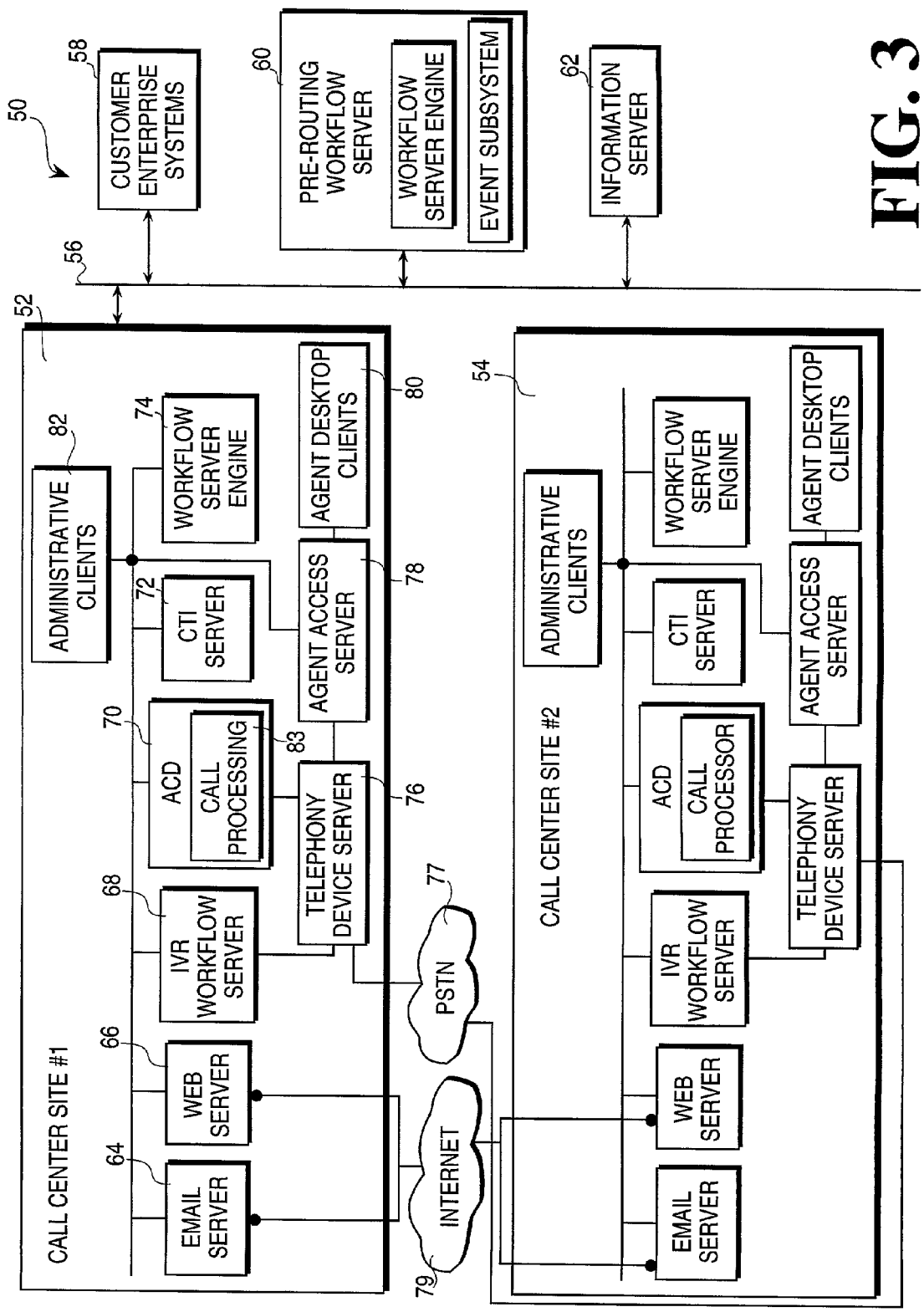
FIG. 3 is a block diagram illustrating an exemplary transaction processing system in the form of a multi-site call center environment that may include a number of the transaction processing systems shown in FIG. 2.

FIG. 3 is a block diagram illustrating an exemplary transaction processing environment 50, in the form of a multi-site call center environment, that may include multiple transaction processing systems 30, such as that shown in FIG. 2. Specifically, FIG. 3 provides an enterprise-wide view of the transaction processing environment 50 that includes two call center sites 52 and 54 that may be coupled via a Wide Area Network (WAN) 56 to each other and to customer enterprise systems 58, an enterprise workflow server 60 and an information server 62. The customer enterprise systems 58 may execute host-based Computer Telephony Integration (CTI) applications, such as "screen pops" and database lookup applications. The pre-routing workflow server 60 may perform a "pre-call routing" function. Merely for example, the workflow server 60 may collect information from multiple call center sites in a multi-site heterogeneous or homogeneous call center environment, interpret this information, and provide routing information to a Service Control Point (SCP) regarding where to route a call based on the call center site data and user preferences. Accordingly, the workflow server 60 provides a framework for a single system image view of resources on multiple call center sites, and the capability to route a call to a specific call center site based on resources, skills and agent availability at the multiple call center sites. Such routing decisions may be based on near real-time data collected from the respective call center sites, and on the routing preferences specified by users. The information server 62 also provides real-time and enterprise-wide information to a multi-site call center system administrator, and may also gather information for the purposes of near real-time management of a multi-site call center environment shown in FIG. 3.

Each of the call center sites 52 and 54 is equipped to receive transaction requests (e.g., calls, e-mails or network requests) over a variety of media, and to process and facilitate transactions between, for example, a source and a human (or software) agent responsive to such transaction requests. To this end, each of the call center sites 52 and 54 is shown to include a number of transaction processing systems, namely an e-mail server 64, a web server 66, an Interactive Voice Response (IVR) workflow server 68, an ACD 70, a Computer Telephony Integration (CTI) server 72 and a workflow server 74. Each call center site 52 and 54 is also shown to include a telephony device server 76, an agent access server 78 and agent desktop clients 80. The ACD 70 is also shown to include call processing functionality 83, whereby telephone calls (e.g., both switched and voice-over-IP calls) may be processed and routed to an available agent teleset (not shown).

Each of the call center sites 52 and 54 also includes a number of administrative clients 82, whereby a call center site administrator may configure and edit workflow definitions that define workflows that are executed by various workflow servers within the respective call center sites.

Figure 4:
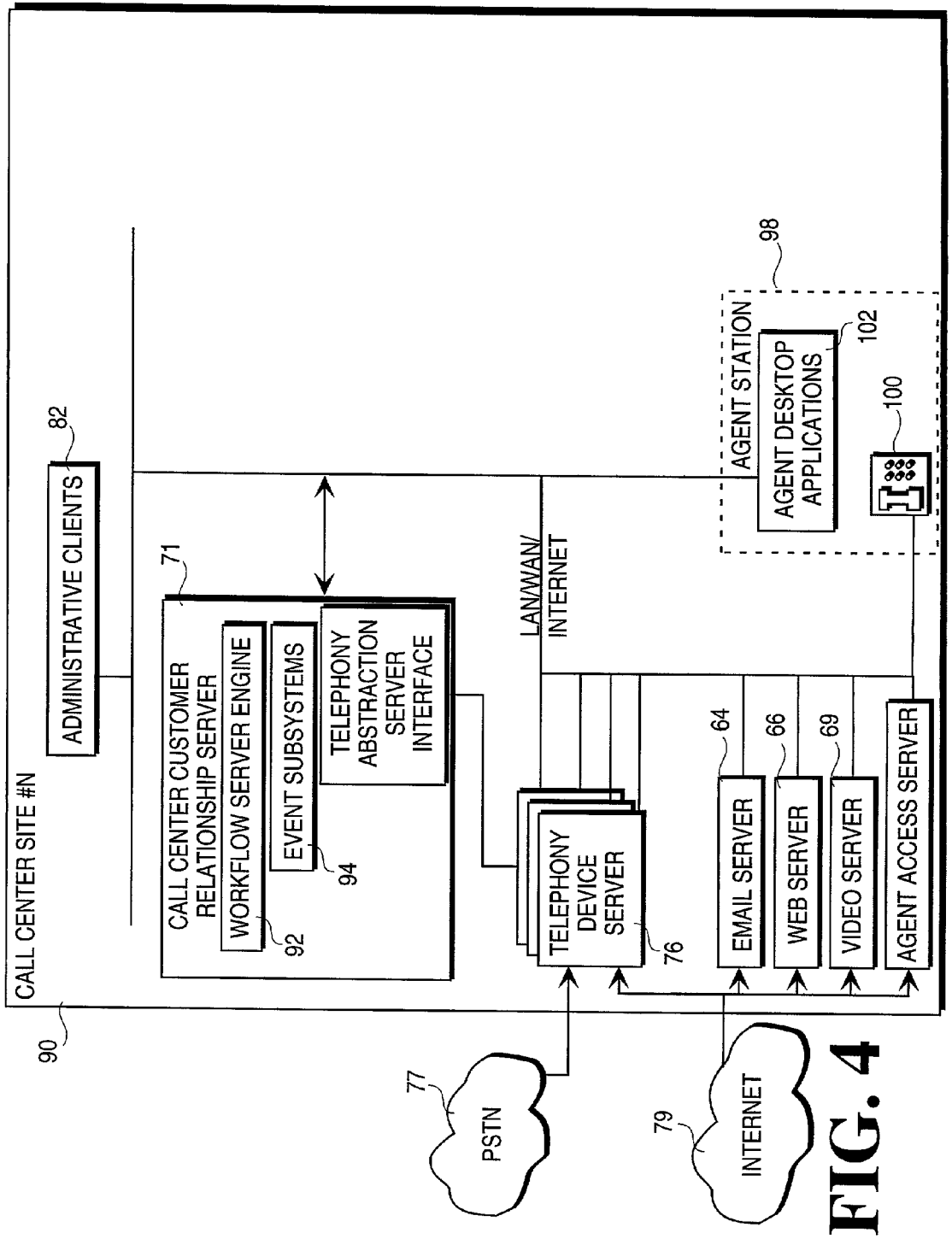
FIG. 4 is a block diagram illustrating a call center site, according to an exemplary embodiment of the present invention, having an alternative architecture from the call center site shown in FIG. 3.

FIG. 4 is a block diagram illustrating a call center site 90, according to an exemplary embodiment of the present invention, having an alternative architecture to the call center sites 52 and 54 illustrated in FIG. 3. Specifically, the workflow server engines for directing and routing calls within the call center sites 52 and 54 of FIG. 3 are shown to be distributed over a number of transaction processing systems, such as the workflow server 74, the IVR workflow server 68, a call center customer relationship server 71, and the CTI server 72. The call center site 90 illustrated in FIG. 4 provides a more integrated environment in which a single workflow server engine 92 within the server 71 routes transaction information over a wide variety of media. The workflow server engine 92 is a provided with "events" by a number of event subsystems 94 that receive input from a number of servers, such as for example in the e-mail server 64, the web server 66, and a video server 69. The event subsystem 94 also provides events to the workflow server engine 92 resulting from telephone calls received at a telephony device server 76 via the Public Switched Telephone Network (PSTN) 77 or via the Internet 79.

The call center site 90 includes a number of agent stations 98, each of which may include a teleset 100 via which a human agent may respond to transaction requests received via any of the media servers and a collection of agent desktop applications 102 for facilitating transaction processing over, for example, the Internet utilizing e-mail or the World Wide Web (WWW). For example, the agent desktop applications 102 may include an e-mail client, a browser client, a web collaboration client and a video conferencing client. These agent desktop applications may be highly integrated, or may be stand-alone applications. Alternatively, each agent station 98 may comprise a software agent, which is able to respond to transaction requests, and process a transaction to completion, in an automated fashion. In one embodiment, the above described transaction request is associated with a transaction event and a transaction task, the transaction task responsive to the transaction request.

The present invention will be described below within the context of a workflow router, which includes a workflow server engine. It will be appreciated that the teachings of the present invention may be applied to any one of the workflow servers, workflow server engines, or call processing functions illustrated in FIG. 3. Further, the teachings of the present invention are also applicable to the "pre-call routing" workflow servers and "post-call routing" workflow servers that may be employed within a transaction processing environment.

Exemplary Workflow Execution System

Figure 5A:
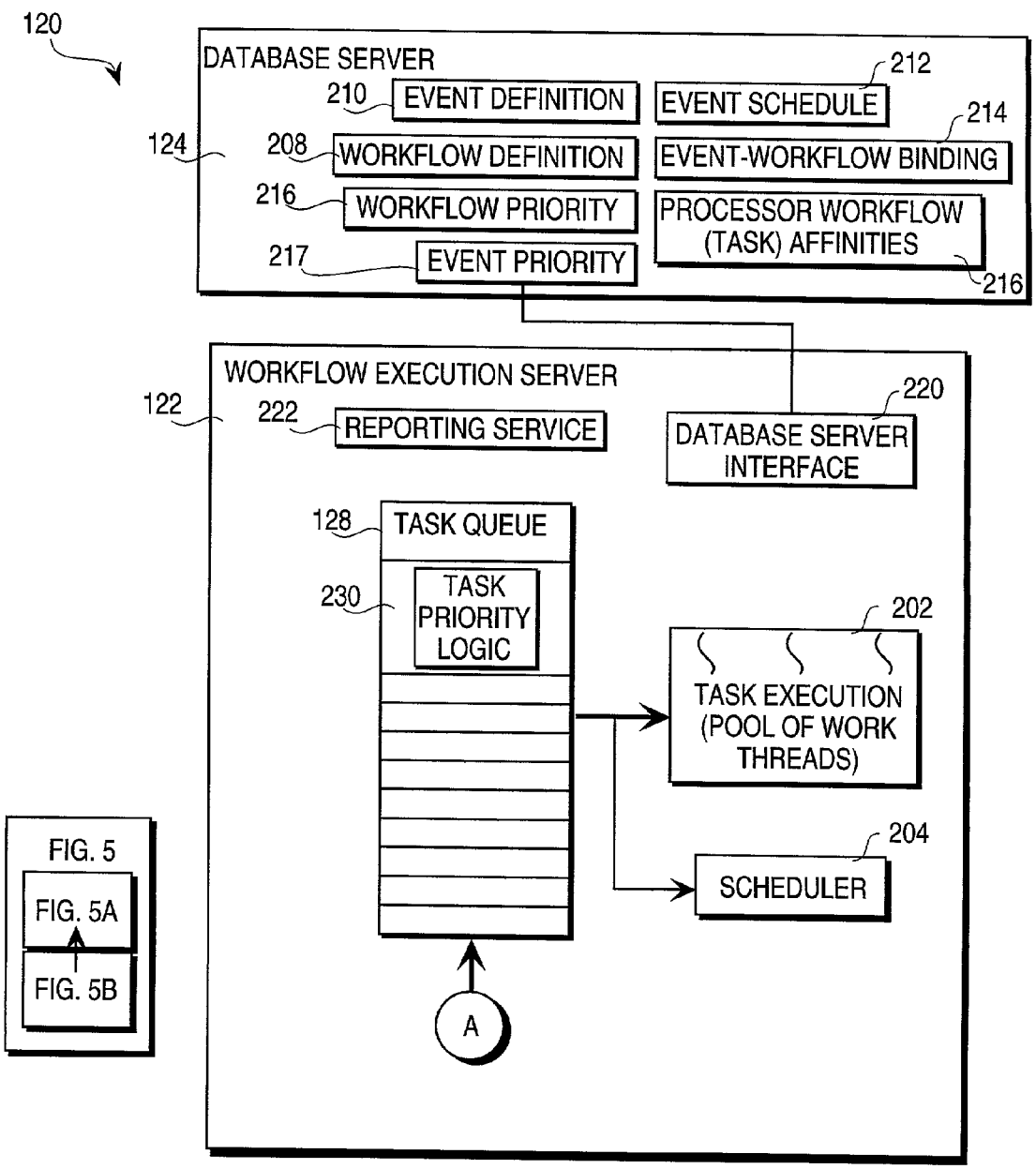
FIGS. 5A and 5B are block diagrams illustrating a workflow execution system, according to an exemplary embodiment of the present invention, that may be employed within a workflow server engine or workflow router described with reference to FIG. 4.
Figure 5B:
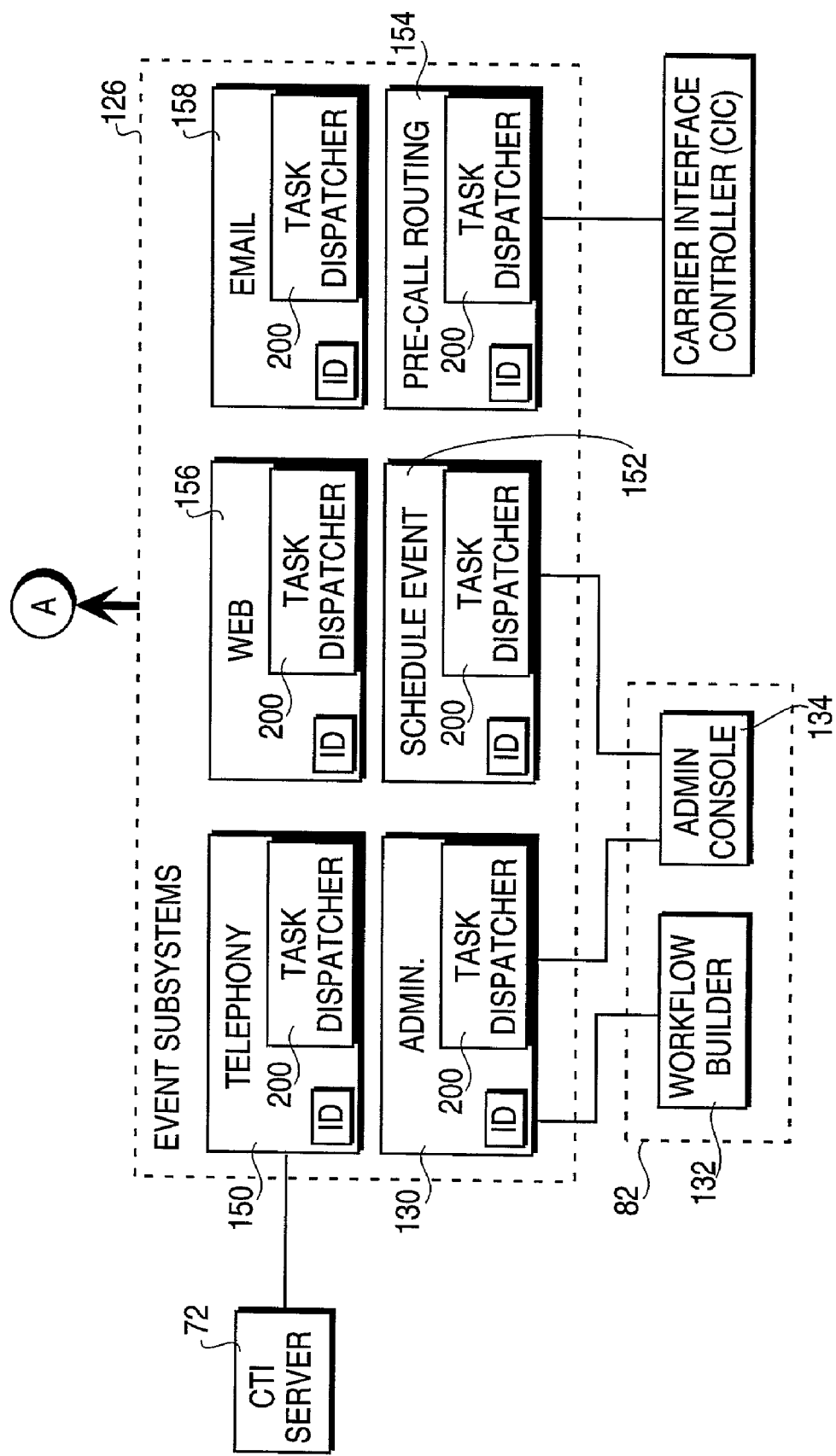

FIGS. 5A and 5B are block diagrams illustrating a workflow execution system 120, according to an exemplary embodiment of the present invention, that may be employed within any one of the workflow server engines or workflow routers described above. The workflow execution system 120 includes a workflow execution server 122 and a database server 124. The execution server 122 includes a number of event subsystems 126 (also termed "event providers") that generate tasks for a task queue 128 responsive to external transaction occurrences that are communicated to the event subsystem 126 as messages from appropriate clients. Such tasks may be any tasks required for the facilitating of a transaction and for fulfilling system requirements within a transaction processing system. While such tasks are described below in the context of routing tasks (for routing a transaction to an agent), the tasks could include data storage and retrieval tasks that store and retrieve data pertinent to the transaction. For example, in one embodiment the task may include a transaction information task to either store or retrieve information pertinent to a transaction. The tasks may also include tasks that facilitate interaction with agents, such as "screen pop" generation. Tasks may also include reporting, maintenance or system administration tasks. Transaction occurrences may include, for example, the receipt of a transaction request (e.g., an e-mail or telephone call), the termination of a transaction by a source (e.g., a client hangs up prior to a queued telephone call being serviced), or a system failure or shutdown for some other reason. As shown in FIG. 5B, each event subsystem 126 calls a re-entrant task dispatcher 200 that is responsible for creating a task object, or set of task objects that may be executed. The tasks are created responsive to reception of an event generated by the relevant subsystem. Specifically, if an event invokes a workflow, a task dispatcher 200 creates a task object that dispatches to, and queued within, the task queue 128 for later execution. To generate such task objects, a called task dispatcher 200 accesses workflow definitions 208, event definitions 210 and event-workflow binding information 214 stored within the database server 124. A pool of worker threads 202 executes tasks stored within the task queue 128. Task priority logic 230 may determine the priority of a task within the task queue 128 utilizing workflow priority information 216 and/or event priority information 217, both of which are stored within the database server 124. A database server interface 220 facilitates access by task dispatchers 200, the task queue 128 and the task priority logic 230 to information stored in the database server 124. Task execution by the pool of worker threads 202 furthermore generates messages to a reporting service 222.

Event Subsystems

Each of the event subsystems 126 generates events by calling an event generator routine provided by the execution server 122. Each of the event subsystems 126 furthermore includes a unique subsystem identifier. In one embodiment, the event subsystems may furthermore be classified as being either (1) administrative event subsystems or (2) schedule event subsystems providing respective administrative and schedule tasks to the tasks queue 128.

Figure 6:
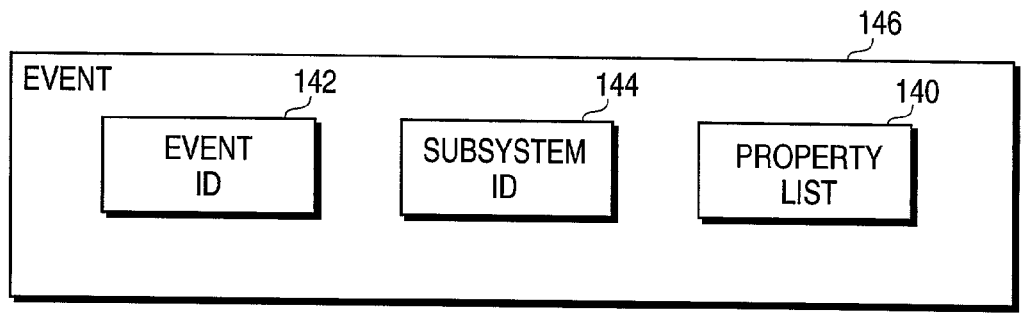
FIG. 6 is a block diagram illustrating the structure of an exemplary event object.

An exemplary event 146, that may be generated by any one of the event subsystems, is illustrated in FIG. 6, and is shown to include an event identifier 142, a subsystem identifier 144 identifying the subsystem that generated the event 146, and a property list 140. The property list 140 is a set of variables or parameters represented as name-value pairs. The database server 124 includes a list of all event definitions 210.

Exemplary event subsystems 126 include an administrative event subsystem that collects TCP/IP messages that control the execution server 122. These messages typically originate from administrative clients 82, such as a workflow builder 132 or an administration console 134, and include a command to be executed by the execution server 122 on the order of the relevant clients. Such commands may include commands directing the execution server 122 (1) to start, stop, suspend, resume or step a workflow, (2) to modify a task being executed within the execution server 122, (3) to modify the number of worker threads included within a pool of such threads, (4) to add or remove an event-workflow binding, or (5) to suspend, resume or shutdown the execution server 122.

An exemplary telephony event subsystem 150 collects messages from, for example, a CTI server 72 regarding telephone calls received at that server. An exemplary schedule event subsystem 152 propagates tasks to the task queue 128 according to a schedule specified by, for example, the administrative console 134. The events generated by the schedule event subsystem 152 may be for any subsystem identifier and event identifier, and may also comprise command events. An exemplary pre-call routing subsystem 154 services pre-routing queries from the PSTN 77, and interacts with pre-routing clients using TCP/IP connection-oriented sockets to provide an interface between such pre-routing clients and the pre-call routing subsystem 154. Other event subsystems may include a web event subsystem 156 and an e-mail event subsystem 158.

Task Dispatcher and Task Queue

The workflow execution server 122 includes a single task queue 128 to manage tasks received from the task dispatchers 200. As noted above, each of the event subsystems 126 generates events that are translated into tasks dispatched to the task queue 128. The tasks are prioritized within the task queue 128 by task priority logic 230, each task being assigned a default priority of zero (0). The task queue 128 utilizes Adaptive Communication Environment (ACE) synchronization methods to ensure that multiple event subsystems 126 may properly share the task queue 128. ACE is a freely available C++ framework, and provides abstractions for sockets, queues and high-level components. ACE is distributed by Douglas Schmidt at Washington University, and further details regarding ACE can be found at: http://www.cs.wustl.edu/~schmidt/ACE.html.

Each task dispatcher 200 furthermore uses ACE notification methods to effectively dispatch tasks to the task queue 128. Specifically, a task dispatcher 200 may look to an event header to determine how to handle the relevant event. If the event is identified as being a workflow event, the task dispatcher 200 matches the event to an associated workflow utilizing the event-workflow binding information 214 stored in the database server 124. The task dispatcher 200 utilizes the subsystem identifier 144 and the event identifier 142 of a relevant event to identify an associated workflow. More than one event-workflow binding may be located. If a matching workflow (or set of workflows) is identified, the workflow (or set of workflows) is instantiated by the task dispatcher 200 to create a task object (or multiple task objects) to execute the workflow(s). These task objects are dispatched to the task queue 128. It should thus be noted that an event may have multiple tasks associated therewith.

In addition to workflow centers that are mapped to workflows using the event-workflow binding information 214 in the manner described above, further event types exist that may conveniently be classified as "task" events and events that may be classified as "command" events. A valid task identifier (not shown) distinguishes a task event 146 in an event header that identifies an associated task. The task dispatcher 200 dispatches a task event to a task specified and identified by the task identifier. Task events send events to an executing task and do not invoke, create or start new tasks. A command event 146 is dispatched by the task dispatcher 200 to a command interpreter (not shown) to execute an included command. A command event may be handled by the pool of worker threads 202, or may alternatively be for a subsystem.

Task Priority Logic

Figure 7:
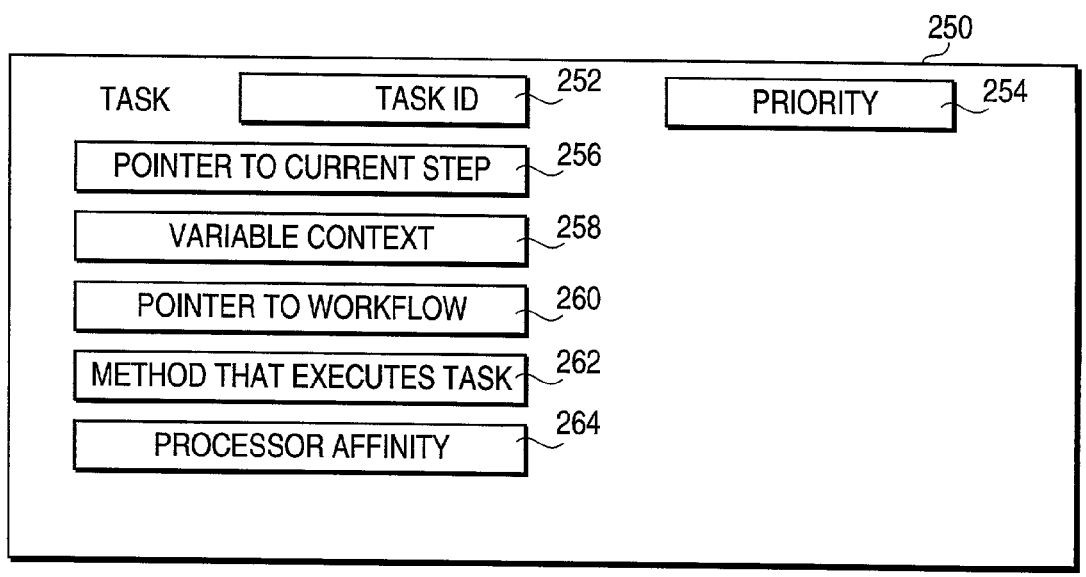
FIG. 7 is a block diagram illustrating the structure of an exemplary task object.

Within the task queue 128, each task 250 has a unique task identifier 252 associated therewith. FIG. 7 is a block diagram illustrating an exemplary task 250, and shows the task identifier 252. Each task 250 may furthermore be assigned a priority 254 corresponding to the priority of the event that generated the task. In one embodiment, workflows (as defined by the workflow definitions 208 in the database server 124) may each have priorities associated therewith, and as recorded in the workflow priority information 216, that override the priorities associated with a task based on an event priority. Again, if no priority for a task is specified, a default priority of zero (0) may be assigned to a task 250. Each task 250 is furthermore shown to include a reference (e.g., a pointer) 256 to a current step or a number of steps that constitute the task 250, a variable context 258 (i.e., data), a pointer to the workflow from which the task 250 was instantiated, at least one method 262 used to execute the task, and a processor affinity 264 identifying a processor within a multiprocessor environment on which the task 250 should preferably be executed. When a sub-task is executed, a stack of the original task and subsequent sub-tasks is maintained for each task object.

Pool of Worker threads

The pool of worker threads 202 is responsible for executing the tasks 205 queued within the task queue 128. As each worker thread becomes available, a scheduler 204 identifies the highest priority task from the task queue 128, and feeds the task to the available worker thread that executes a single step of the relevant task. Further details regarding the execution of tasks by the pool of threads, where the pool of threads are executed on a multiprocessor platform, are provided below.

In an alternative embodiment of the present invention, an algorithm implemented within a scheduler associated with the task queue 128 may intelligently determined a "Best-Match" between an available thread and the tasks that are queued within the task queue 128. This "BestMatch" determination may be based on any number of parameters, such as a dynamically assigned priority or processor affinity.

In identifying a task to be attributed to an available worker thread, the scheduler 204 may identify a "real-time" priority associated with a task. Specifically, a task identified as having a "real-time" priority will be regarded as having a highest priority, and assigned to an available thread ahead of any other tasks not having a "real-time" priority. In one embodiment of present invention, specific threads may be members of a "real-time" process priority class, and a task having a "real-time" priority will be attributed to such threads by the scheduler.

Database Server Interface

As illustrated in FIG. 5, the execution server 122 has a database connection via the database server interface 220 to the database server 124. In one embodiment of the present invention, this connection to the database server 124 may be via a Remote Procedure Call (RPC) interface. Upon initialization of the workflow execution server 122, data is loaded from the database server 124. Specifically, the data required at initialization by the workflow execution server 122 includes (1) event-to-workflow bindings, (2) workflow definitions, (3) event definitions, (4) event schedules, and (5) execution server parameters (e.g., thread pool size).

Methodology-Task Creation

Figure 8:
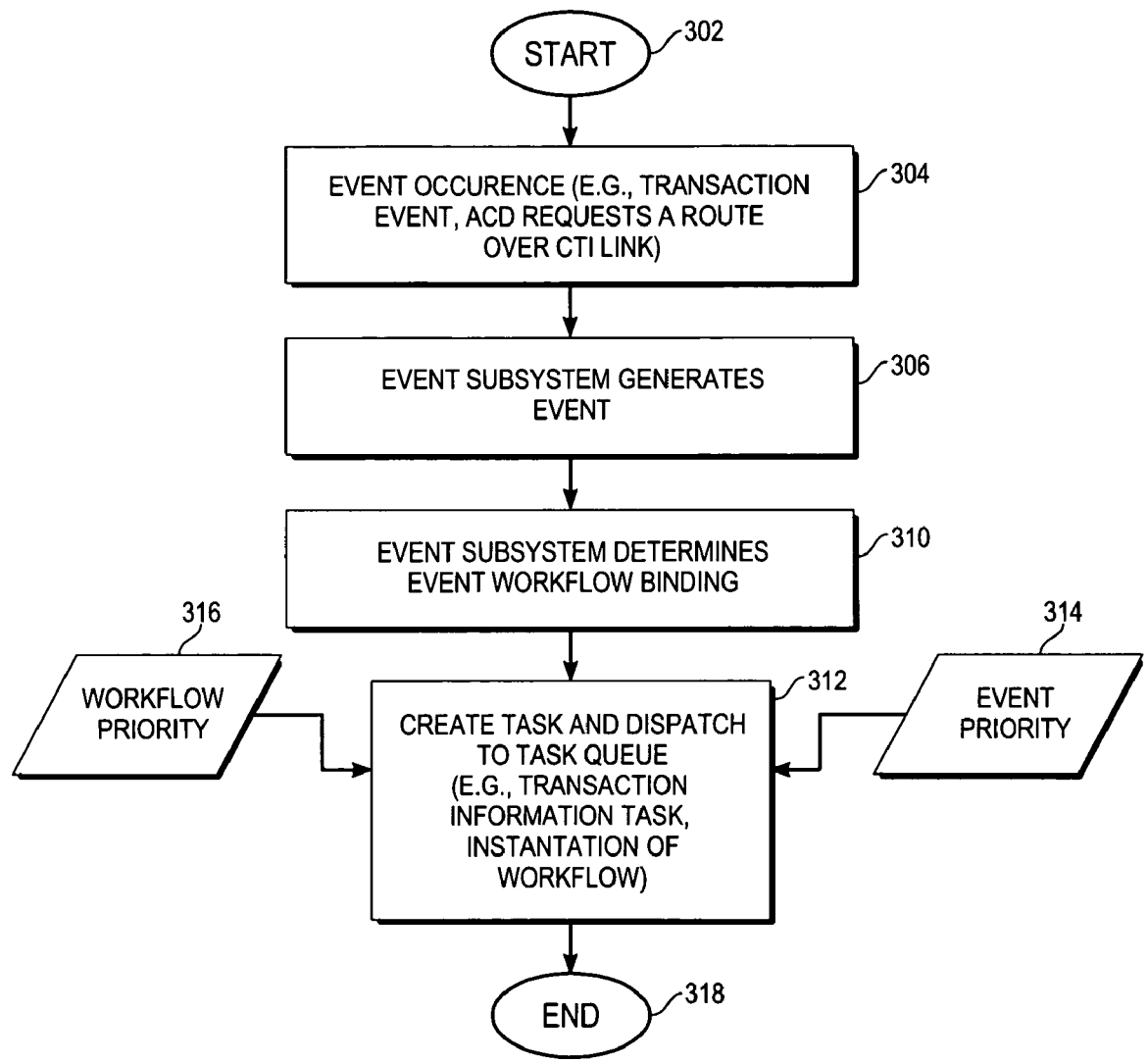
FIG. 8 is a flowchart illustrating a method, according to an exemplary embodiment of the present invention, of creating task object that is queued within a task queue illustrated in FIG. 5.

FIG. 8 is a flowchart illustrating a method 300, according to an exemplary embodiment of the present invention, of creating a task that is queued within the task queue 128. The method 300 commences at 302, and proceeds to step 304, where an event occurrence is identified by an event subsystem 126. Merely for example, an ACD 70, shown in FIG. 3, on receipt of a telephone call, may request a route over a CTI link to an agent. At step 306, the relevant event subsystem (e.g., the telephony subsystem 150) generates an event, such as that illustrated in FIG. 6. The event subsystem attributes a priority level to the event based on event content and/or event type. At step 310, the task dispatcher 200 called by the event subsystem determines an event-workflow binding utilizing the event-workflow binding information 214 that was downloaded to the execution server 122 at initialization. At step 312, the task dispatcher 200 creates a task 250 (and dispatches the task to queue 128) by creating an instantiation of the workflow identified as being associated with the relevant event. The task 250 may be attributed a priority, as described above, based on the priority 314 of an underlying event or on a priority 316 assigned to the workflow. The method 300 then terminates at step 318.

Methodology-Task Execution

Figure 9:
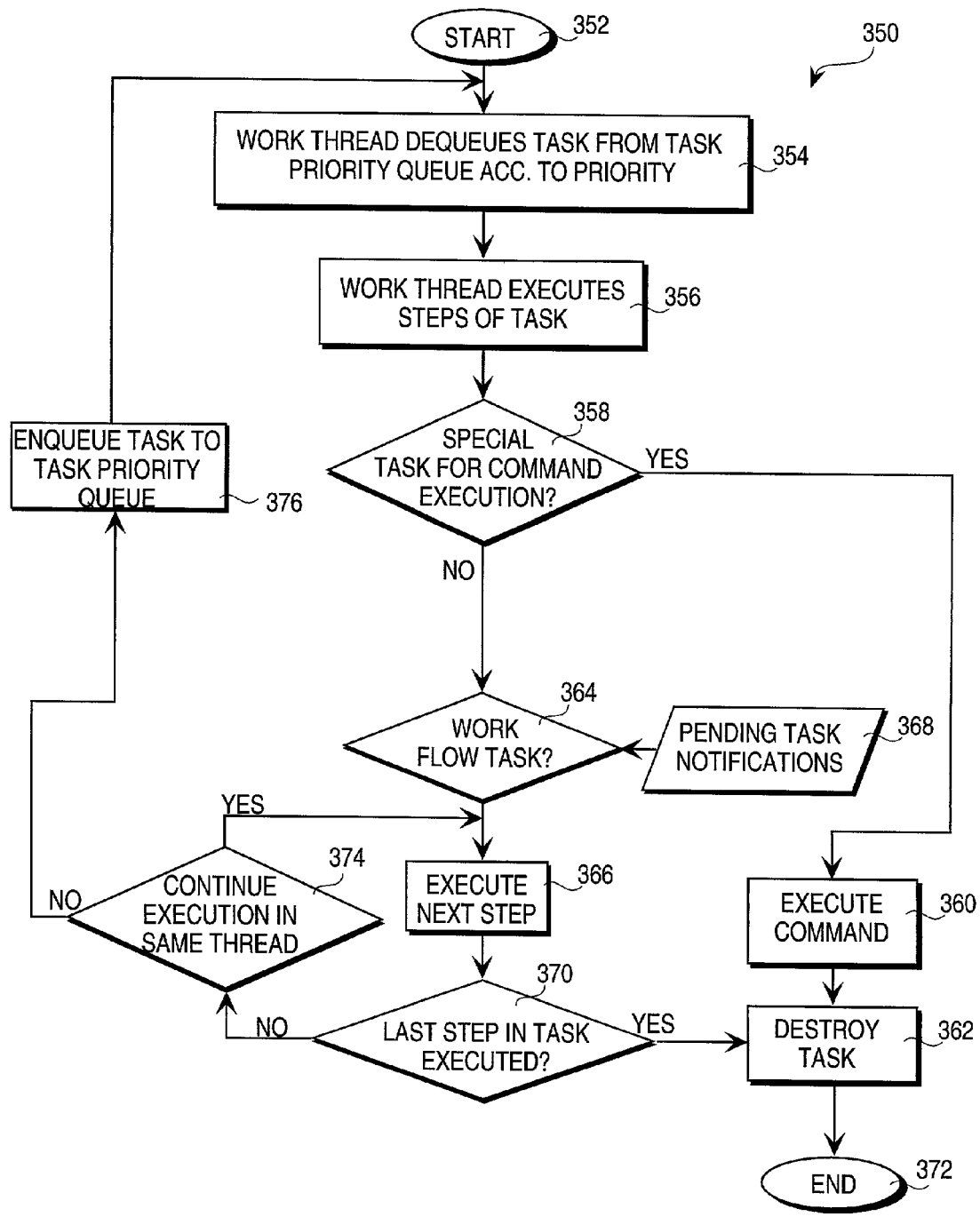
FIG. 9 is a flowchart illustrating a method, according to an exemplary embodiment of the present invention, of executing a transaction task within a multiprocessor system, such as a Symmetrical Multiprocessor (SMP) system.

FIG. 9 is a flowchart illustrating a method 350, according to an exemplary embodiment of the present invention, of executing a task 250 within a multiprocessor system, such as for example a Symmetrical Multiprocessor (SMP) system. The method 350 commences at 352, and proceeds to step 354, where a worker thread within the pool of threads 202 becomes available as a result of completion of a preceding task. The available worker thread then receives a task having a highest priority from the task queue 128, as identified by the scheduler 204. At step 356, the worker thread then executes one or more steps of the de-queued task. Specifically, a "dispatcher" within the kernel of an operating system, such as the Windows NT® (operating system, assigns a thread to which the task is assigned to a processor within the multiprocessor system. In assigning a thread to a processor within such a multiprocessor system, the dispatcher will consider "thread affinity" that may specify a single processor, or group of processors, on which the thread may execute. In an exemplary embodiment, thread affinity may be determined by a thread affinity mask, in the form of a bit vector representing the processors on which the respective thread is allowed to run. The thread affinity may also be specified by a process affinity mask, for a process within which the thread is included, that comprises a bit vector specify processors on which the process is allowed to run.

Further, the dispatcher within the kernel of the operating system may recognize "real-time" priorities attributed to certain threads within the pool threads 202. Such threads may be dispatched to processors ahead of threads having non-"real-time" priorities. This is especially applicable in a real-time operating system that guarantees interrupt latency or some other way for threads to obtain a guaranteed execution time.

At the same decision box 358, a determination is then made as to whether task is a "command" task for command execution. If so, the relevant command is executed at step 360, whereafter the task is destroyed at step 362. Alternatively, should the task not be a command task, a determination is made at decision box 364 as to whether the task is a workflow task. If so, the next step of the relevant task is executed at step 366. Pending task notifications, indicated at 368, cause available exception handlers to set the next step. At decision box 370, a determination is made as to whether the step executed at step 366 was the last step of the task. If not, the method 350 proceeds to make a further determination at decision box 376 whether execution should continue for the same thread. If so, the method 350 loops back to step 366, and a next consecutive step of the relevant task is executed. Following a negative determination at decision box 374, the task is returned to, and again queued within, the task queue 128.

If the last step of the task has been executed, as recognized at decision box 370, the task is destroyed at step 362. The method 350 then terminates at step 372.

After all actions or steps associated with a task are completed, the thread then grabs the next available task from the task priority queue 128 for execution.

Accordingly, it will be appreciated that a task, which at least partially implements a workflow, is executed by any one of the worker threads within the pool of threads 202 that is available, or becomes available. Each of the worker threads within the pool 202 may execute on a designated processor within a bank of processors 32, such as that illustrated in FIG. 2. In the absence of any processor or thread affinity associated with a task, the task may accordingly be executed on any one of the processors within the bank of processors 32. As events may be both non-critical or real-time critical events, it will be appreciated that event types are not limited to being handled on one specific processor operating under the direction of one specific operating system. Accordingly, by allowing tasks generated responsive to events of any type to the executed on any one of a bank of processors by any one thread within a pool of threads, a transaction processing system such as that illustrated in FIG. 2 is able to re-distribute resources to threads within the pool of threads 202, and accordingly across a bank of processors 32, to serve specific peak performance demands. Further, scalability of the transaction processing system 30 is enhanced.

Figure 10:
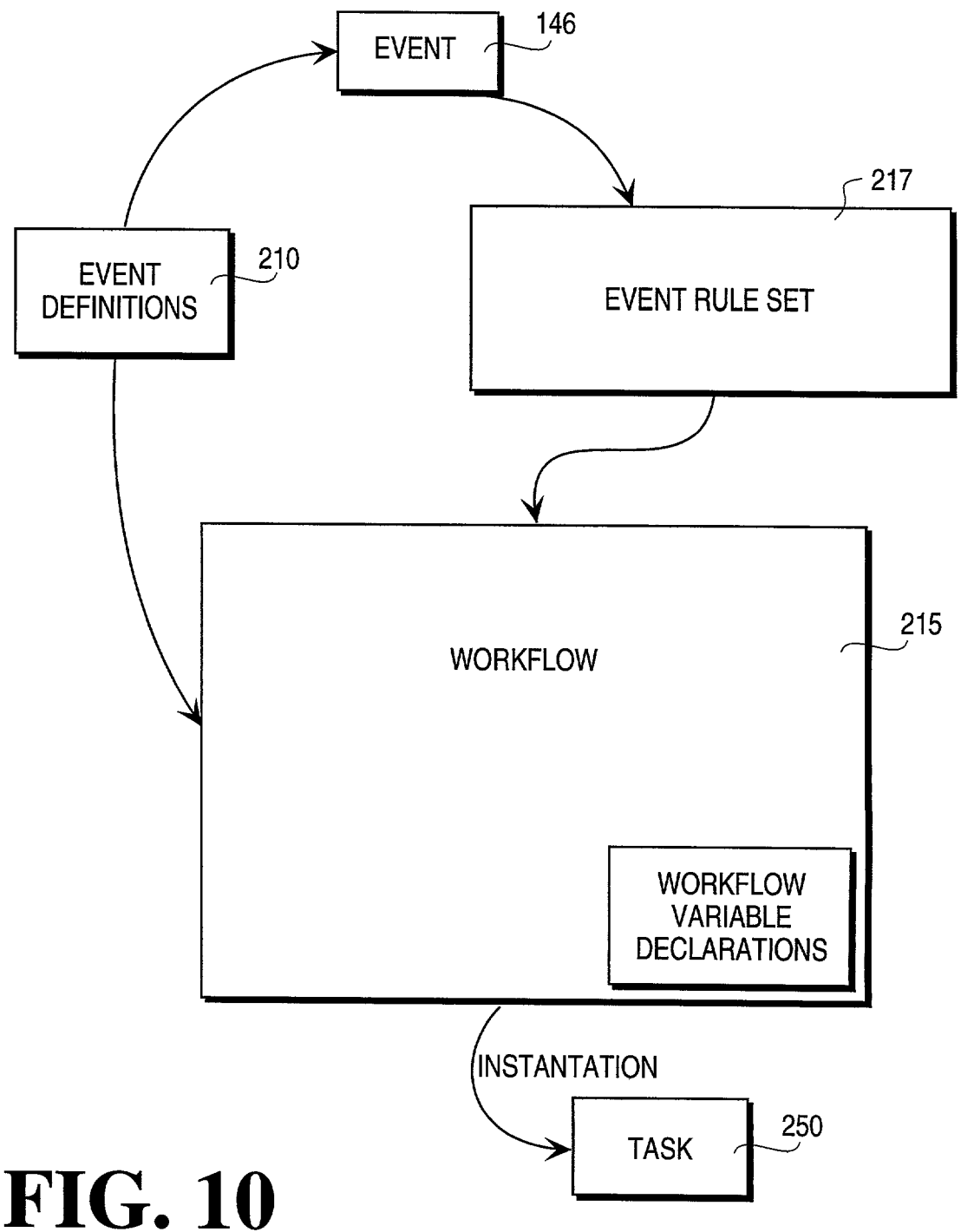
FIG. 10 is a block diagram providing a conceptual representation of the creation of event and task objects.

FIG. 10 is a block diagram providing a conceptual illustration of the generation of a task 250, that is queued within the task queue 128, responsive to an event 146. Specifically, the event definitions 210, which are stored in the database server 124 shown in FIG. 5, provide input to both the identification of the event 146 and into the workflow 215 through the event-workflow bindings 214, which are also stored in the database server 124. The workflow 215 may, for example, included the workflow definitions 208 and the workflow priority information 216 stored in the database server 124. The event 146 is then compared to an event rules set 217, which may include the event-workflow bindings 214, to identify a workflow for the given event, considering the event type and the event content. The workflow 215 is then shown to the instantiated as a set of tasks 250 that are propagated by the re-entrant task dispatchers 200 called by the various event subsystems to the task queue 128.

Accordingly, a method and apparatus for executing a transaction task within a transaction processing system employing a multiprocessor architecture have been described. Although the present invention has been described with reference to specific exemplary embodiments, it will be evident that various modifications and changes may be made to these embodiments without departing from the broader spirit and scope of the invention. Accordingly, the specification and drawings are to be regarded in illustrative rather than a restrictive sense.

What is claimed is:

1. A method of processing transaction routing tasks, the method including:
   receiving a plurality of transaction requests at an automatic call distribution system;
   generating a respective transaction event responsive to receiving each of the transaction requests, the transaction event for routing the transaction request to an agent of the automatic call distribution system;
   responsive to the respective transaction events, identifying a respective workflow associated with each transaction event;
   assigning a workflow priority to at least one workflow;
   creating a respective task object for each of the transaction events and identified workflows;
      assigning a task priority to each respective task object based upon the workflow priority whenever a workflow priority has been assigned to the respective workflow, but otherwise based upon a priority of each respective event;
   queuing the task objects in a task object queue;
   distributing a task object of the task objects, which at least partially executes the workflow, from the task object queue to an available thread within a pool of available threads operating within a multiprocessor system based upon the task priority of the task object;
   identifying a processor affinity attributed to the distributed task object; and
   assigning the available thread to a processor within the multiprocessor system according to the processor affinity attributed to the distributed task object to route the transaction request to the agent of the automatic call distribution system.

2. The method of claim 1, wherein the transaction routing tasks includes any one from a group of transaction routing tasks including receipt of a telephone call, receipt of a hang up, a request to store data, a request to retrieve data, a request to generate a user interface for the agent.

3. The method of claim 1, wherein the priority of each event is attributed based upon at least one of event content and event type.

4. The method of claim 1, wherein a stack of the original task and subsequent sub-tasks is maintained for each task object when a sub-task is executed.

5. The method of claim 1, wherein the transaction routing task has a real-time priority and is distributed in accordance with the real-time priority to the available thread within the pool of threads.

6. The method of claim 1, including assigning the available thread to a processor within the multiprocessor system according to a thread priority.

7. The method of claim 6, including assigning the thread priority to the available thread based on a priority of the transaction routing task distributed to the available thread.

8. The method of claim 1, further including determining a best match between the transaction routing task and the available thread.

9. The method of claim 1, wherein the available thread is a member of a class of threads that are included in the pool of threads, the class of threads being associated with the priority.

10. A system for processing transaction routing tasks, the system including:
    an automatic call distribution system to receive a plurality of transaction requests;

a plurality of different types of event subsystems to generate respective transaction events responsive to receiving each of the plurality of transaction requests, the transaction event for routing the transaction request to an agent of the automatic call distribution system;

a dispatcher to identify a respective workflow associated with each of the transaction events and that creates a respective task object for each of the plurality of transaction events and workflows and assigns a workflow priority to at least one of the workflows;

a task object queue that contains the respective task objects of the plurality of transaction requests and including task priority logic which assigns a task priority to each respective task object based upon the workflow priority whenever a workflow priority has been assigned to the respective workflow but otherwise based upon a priority of each respective event;

a scheduler that selects a task object from the task object queue where the selected task object at least partially executes the workflow associated with the transaction event, the scheduler to select the task object from the task object queue based upon the task priority of the selected task object; and a thread within a pool of available threads operating within a multiprocessor system to execute the selected task object of the transaction routing task, the dispatcher to identify a processor affinity attributed to the selected task object, and to assign the thread to a processor within the multiprocessor system according to the processor affinity attributed to the selected task object to route the transaction request to the agent of the automatic call distribution system.

11. The system of claim 10, wherein the dispatcher is to generate the transaction routing task that at least partially executes the workflow and wherein the processor affinity is determined by an affinity mask in the form of a bit vector representing the processors on which the respective thread is allowed to run.

12. The system of claim 11, wherein the transaction routing task is dispatched by the dispatcher to the task queue, and wherein the thread within the pool of threads receives the transaction routing task from the task queue.

13. The system of claim 12, wherein the scheduler is to issue the transaction routing task from the task queue to the thread within the pool of threads.

14. The system of claim 13, wherein the scheduler is to issue the transaction routing task from the task queue to the thread within the pool of threads based on the priority associated with the transaction routing task.

15. The system of claim 14, wherein the scheduler is to issue the transaction routing task from the task queue according to a real-time priority assigned to the transaction routing task.

16. The system of claim 10, wherein the scheduler is to assign the thread to a processor within the multiprocessor system according to a thread priority.

17. The system of claim 16, wherein the scheduler is to assign the thread priority to the thread based on a priority of the transaction routing task distributed to the thread.

18. The system of claim 10, wherein the scheduler is to determine a best match between the transaction routing task and the available thread.

19. The system of claim 10, wherein the available thread is a member of a class of threads that are included in the pool of threads, the class of threads being associated with the priority.

20. A system for processing transaction routing tasks, the system including:

a first means to receive a plurality of transaction requests;

a second means to generate a respective transaction event responsive to receiving each of the transaction requests, the transaction events for routing the transaction requests to agents of the first means each transaction event having a subsystem identifier and an event identifier;

a third means to identify a workflow associated with each of the transaction events based upon the subsystem identifier, the event identifier, and event workflow binding information;

a task dispatcher that creates a task object for each of the transaction events;

a task queue that contains the task objects of the plurality of transaction events;

a fourth means to select a task object of the plurality of task objects where the selected task object at least partially executes the workflow associated with the transaction event and where selection is based upon a relative priority of the plurality of task objects; and a fifth means within a pool of available threads operating within a multiprocessor system to execute the selected task object, the third means to identify a processor affinity attributed to the transaction routing task, and to assign the thread to a processor within the multiprocessor system according to the processor affinity attributed to the transaction routing task to route the transaction request to the agent of the first means.

21. A tangible machine readable medium storing a set of instructions that, when executed by a machine, cause the machine to:

receive a plurality of transaction requests at a automatic call distribution system;

generate a respective transaction event responsive to receiving each of the plurality of transaction requests, the transaction events to route the transaction requests to agents of the automatic call distribution system;

responsive to the transaction events, identify a respective workflow associated with each of the plurality of transaction events;

responsive to the identification of the workflows, creating a task object for each of the transaction requests;

select and distribute a task object of the plurality of task objects, which at least partially executes the workflow, from a task queue to an available thread within a pool of available threads operating within a multiprocessor system based upon a relative priority of the task objects;

identify a processor affinity attributed to the selected task object of the transaction routing task; and assign the available thread to a processor within the multiprocessor system according to the processor affinity attributed to the transaction routing task to route the transaction request to the agent of the automatic call distribution system.

* * * * *